United States Patent
Kohlmann et al.

(10) Patent No.: US 10,928,184 B2
(45) Date of Patent: Feb. 23, 2021

(54) METHOD FOR CHECKING FOR COMPLETENESS

(71) Applicant: IFM ELECTRONIC GMBH, Essen (DE)

(72) Inventors: Klaus Kohlmann, Ravensburg (DE); Javier Massanell, Markdorf (DE); Mike Gonschior, Herdecke (DE)

(73) Assignee: IFM ELECTRONIC GMBH, Essen (DE)

( * ) Notice: Subject to any disclaimer, the term of this patent is extended or adjusted under 35 U.S.C. 154(b) by 112 days.

(21) Appl. No.: 16/318,880

(22) PCT Filed: Jun. 28, 2017

(86) PCT No.: PCT/EP2017/066009
§ 371 (c)(1),
(2) Date: Jan. 22, 2019

(87) PCT Pub. No.: WO2018/033285
PCT Pub. Date: Feb. 22, 2018

(65) Prior Publication Data
US 2020/0149871 A1 May 14, 2020

(30) Foreign Application Priority Data

Aug. 15, 2016 (DE) .................... 10 2016 215 144.4

(51) Int. Cl.
| | |
|---|---|
| G06K 9/00 | (2006.01) |
| B07C 5/00 | (2006.01) |
| G01B 11/06 | (2006.01) |
| G06T 7/593 | (2017.01) |
| G06T 7/70 | (2017.01) |
| H04N 13/204 | (2018.01) |
| G06K 9/32 | (2006.01) |

(Continued)

(52) U.S. Cl.
CPC ........ *G01B 11/0608* (2013.01); *G06K 9/3233* (2013.01); *G06T 3/40* (2013.01);
(Continued)

(58) Field of Classification Search
USPC ........ 382/100, 103, 106–107, 141–142, 154, 382/162, 168, 173, 181, 199, 203, 209,
(Continued)

(56) References Cited

U.S. PATENT DOCUMENTS 5,127,737 A * 7/1992 Neri ................. A24C 5/3412
209/535
6,531,693 B1 * 3/2003 Focke ................. B65B 19/32
209/535

(Continued)

FOREIGN PATENT DOCUMENTS

DE 4000658 A1 8/1990
DE 19753333 A1 6/1999
(Continued)

OTHER PUBLICATIONS

Transportation Research Part E: Logistics and Transportation Review vol. 44, Issue 1, Jan. 2008, pp. 124-135 (Year: 2008).*

*Primary Examiner* — Seyed H Azarian
(74) *Attorney, Agent, or Firm* — Harness, Dickey & Pierce, P.L.C.

(57) ABSTRACT

A method for checking the completeness of a container provided with a plurality of objects by means of a 3D camera includes providing a three-dimensional image of the objects and a multi-ROI. The multi-ROI includes a plurality of ROIs which have a user-settable shape and are arranged within the multi-ROI in a user-settable number of rows, columns and raster type, including a learning mode and a temporally subsequent working mode.

10 Claims, 7 Drawing Sheets

(51) Int. Cl.
*G06T 3/40* (2006.01)
*G06T 3/60* (2006.01)
*G06T 7/00* (2017.01)

(52) U.S. Cl.
CPC ............ *G06T 3/608* (2013.01); *G06T 7/0008* (2013.01); *G06T 7/593* (2017.01); *G06T 7/70* (2017.01); *H04N 13/204* (2018.05); *G06T 2200/04* (2013.01); *G06T 2200/24* (2013.01); *G06T 2207/10028* (2013.01); *G06T 2207/30108* (2013.01)

(58) Field of Classification Search
USPC ....... 382/219, 254, 291, 305, 321, 195, 286; 209/535, 522, 537
See application file for complete search history.

(56) References Cited

U.S. PATENT DOCUMENTS

| | | | |
|---|---|---|---|
| 2013/0177250 A1* | 7/2013 | Yamamoto | G06T 7/0004 |
| | | | 382/195 |
| 2013/0215259 A1 | 8/2013 | Sato | |
| 2017/0074851 A1* | 3/2017 | Joplin | G01N 29/11 |
| 2017/0352149 A1* | 12/2017 | Franchi | G06T 7/0008 |
| 2018/0211373 A1* | 7/2018 | Stoppa | G06K 9/4628 |

FOREIGN PATENT DOCUMENTS

| | | |
|---|---|---|
| DE | 02010021851 A1 | 12/2011 |
| DE | 102015216446 A1 | 3/2017 |

\* cited by examiner

METHOD FOR CHECKING FOR COMPLETENESS

CROSS-REFERENCE TO RELATED APPLICATIONS

This application is a National Stage of International Application No. PCT/EP2017/066009 filed on Jun. 28, 2017. This application claims the priority to German Patent Application No. 10 2016 215 144.4, filed on Aug. 15, 2016. The entire disclosures of the above applications are incorporated herein by reference.

FIELD

The disclosure relates to a method for checking the completeness of a container provided with a plurality of objects by means of a 3D camera, which provides a three-dimensional image of the objects and preferably also of the container, and a multi-ROI, wherein the multi-ROI includes a plurality of ROIs which have a user-settable shape and are arranged within the multi-ROI in a user-settable number of rows, columns and raster types, including a learning mode and a temporally subsequent working mode.

BACKGROUND

This section provides background information related to the present disclosure which is not necessarily prior art.

Thus, the present disclosure is concerned with solving completeness tasks. Typical applications include checking whether all bottles are in a box, checking whether a milk carton is filled with all milk packets, or checking whether all yoghurt cups are present inside a package. Such a check is carried out with the aid of a 3D camera which provides a three-dimensional image of the container with the objects contained therein. These image data can be evaluated in such a way that it can be checked in an automated process whether all intended objects are actually present in the container.

In such optical methods it is often worked with ROIs (regions of interest). An ROI is formed by a closed geometric element, such as a circle or square. Thus, the "region of interest" is the area within the closed geometric element, e.g. within the circle or square. ROIs are used in order to carry out an optical evaluation only in a particular detected area, typically in the area in which an object is expected. In this case, a plurality of ROIs can be combined into a multi-ROI, so that a multi-ROI usually comprises a predetermined number of ROIs, which are arranged, for example, in a respective predetermined number of columns and rows.

When using a 3D camera, the captured image is typically available as a three-dimensional pixel matrix, wherein the pixel matrix includes in one dimension distance values of the detected objects with respect to the 3D camera and in the other two dimensions position values in respective planes perpendicular thereto. In this way, a distance value can be assigned to each ROI within the multi-ROI. If the expected object actually exists, the distance value between the object and the 3D camera will be less than in the case where the object is missing. In this way, limit values can be defined for detecting that an object exists or is missing. Overall, it can be checked whether the container is completely filled with objects.

In the case of such methods known from practice, the problem arises that the setting of these limit values is sometimes complicated and not very user-friendly.

SUMMARY

This section provides a general summary of the disclosure, and is not a comprehensive disclosure of its full scope or all of its features.

Therefore, it is the object of the disclosure to provide such a method for completeness check which is easy to set up.

This object is achieved by the subject matter of claim 1. Preferred embodiments of the disclosure are described in the dependent claims.

Thus, according to the disclosure a method for checking the completeness of a container provided with a plurality of objects with the aid of a 3D camera is provided which provides a three-dimensional image of the objects, and a multi-ROI, wherein the multi-ROI includes a plurality of ROIs which have a user-settable shape and are arranged within the multi-ROI in a user-settable number of rows, columns and raster type, including a learning mode and a temporally subsequent working mode, wherein the learning mode comprises the steps of:

capturing an image of the objects in the form of a three-dimensional pixel matrix by means of the 3D camera, wherein the pixel matrix comprises in one dimension distance values of the captured objects with respect to the 3D camera and in the other two dimensions position values in respective planes perpendicular thereto, reproducing the captured image as a two-dimensional image with the position values in a first image area, displaying input fields for the shape or the number of rows, columns and raster type of the ROIs.

displaying a two-dimensional multi-ROI with a user-entered number of rows, columns and raster type of the ROIs and a user-entered shape of the ROIs in the first image area, adjusting the size, position and skew of the multi-ROI in response to at least one user input, adjusting the size of the ROIs in response to at least one user input, displaying height values derived from the distance values for each ROI in a second image area which is different from the first image area, displaying a lower limit and/or an upper limit for the height values in the second image area, adjusting the lower limit and/or the upper limit for the height values in response to at least one input of the user, and switching to working mode, wherein the working mode comprises the following step:

indicating a state of a respective ROI, wherein the state of the respective ROI is one of the states "overfilled" and/or "underfilled" and "good" and wherein the state "overfilled" is indicated when the height value of the respective ROI is above the upper limit, the state "underfilled" is indicated when the height value of the respective ROI is below the lower limit, and the state "good" is indicated when the height value is not outside an intended limit.

It is thus a significant aspect of the disclosure that a display, preferably on a screen, is provided in two independent image areas. In the first image area, the captured image of the objects is reproduced as a two-dimensional image. In addition, in the first image area the two-dimensional multi-ROI is displayed which can be adjusted there by a user by means of corresponding entries in terms of their size, position and skew as well as with regard to the size of the ROIs. In the second image area which is different from the first image area, height values derived from the detected distance values are displayed for each ROI along with a lower limit and/or an upper limit for the height values, wherein these limits are user-settable. Thus, the user is provided with a graphical user interface that enables in an easy way, namely completely visualized, the possibility to set up the completeness check.

In the learning mode following the working mode, the state of a respective ROI is then indicated, wherein the state of the respective ROI can assume at least two states, namely on the one hand "good" and on the other hand "overfilled" and/or "underfilled". If only an upper limit or a lower limit is defined, the state of the respective ROI can thus assume exactly two states, namely "good" on the one hand and "overfilled" or "underfilled" on the other hand. In the definition of a lower limit and an upper limit, the state of the respective ROI may assume three states, namely "good", "overfilled" and "underfilled". Incidentally, the state "good" is always indicated when the height value of the respective ROI is not outside a defined limit, i.e., if respectively provided, not above the upper limit and not below the lower limit.

Basically, there are different ways to indicate the height values derived from the distance values for each ROI. For example, the indication is possible in the form of numeric values. According to a preferred embodiment of the disclosure, however, it is provided that the height values derived from the distance values for each ROI in the second image area are indicated as lines with lengths corresponding to the respective height value. This makes the visualization of whether a respective object is in its intended place in the container particularly easy and comprehensible for the user.

In this connection, a user-settable numerical display can also be provided for the indication of the use-settable lower limit or/and upper limit for the height values. According to a preferred embodiment of the disclosure, the lower limit and/or the upper limit for the height values are respectively indicated as boundaries, preferably extending perpendicular to the lines indicating the respective height values. In this way, the user of the method can recognize directly whether the respective height value in a corresponding ROI lies appropriately relative to the upper or lower limit. This makes the setting of the lower or the upper limit as a switching point for detecting of a specific state of the ROI particularly easy and reliable.

Finally, it is preferably provided in this context that the boundary can be shifted by the user by means of a cursor. This cursor can e.g. be movable by means of a mouse. Alternatively, a touch display may be provided, so that the boundaries can be shifted by means of a finger gesture. In comparison with the input of numerical values, the shift of the boundaries by means of a cursor or by means of a finger gesture is much more intuitive, in particular since in this way it is possible to work directly relative to the displayed height values.

When reproducing the captured image as a two-dimensional image with the position values in the first image area, the reproduction of distance data can basically be dispensed with. Preferably, however, it is provided that in the learning mode when reproducing the captured image as a two-dimensional image with the position values in the first image area, the distance data are displayed coded as colors, wherein different colors indicate different distances, e.g. the color "red" indicates a smaller distance than the color "blue".

In principle, the rows and columns of the multi-ROI need not all have the same width, so that different row widths and different column widths may be provided. According to a preferred embodiment of the disclosure, however, it is provided that in the learning mode the two-dimensional multi-ROI is automatically generated based on the number of rows and columns specified by the user such that all rows have the same row width and all columns have the same column width. According to a preferred embodiment of the disclosure, it is further provided that the size, the position or/and the skew of the multi-ROI or/and the size of the ROIs can be set by the user by means of a cursor or by means of a finger gesture. Furthermore, it is preferably provided that the shape of the ROIs is the same for all ROIs.

For the completeness check it is basically sufficient if only one image of the objects is captured and reproduced. According to a preferred embodiment of the disclosure, however, an image of the container is detected and reproduced, too. In particular in the learning mode, this is helpful in that in this way the adjustment of the size, the position and the skew of the multi-ROI is facilitated, namely, can be supported by displaying the outer boundary of the container.

In the working mode, the states of the respective ROIs can be indicated in different ways. Here, it is preferably provided that the states of the respective ROIs in the working mode are indicated coded as colors or gray values in the first image area. This is thus a similar representation as it may already be provided in the learning mode for the height values. Alternatively or additionally, it is provided according to a preferred embodiment to display the states of the respective ROIs in the working mode in an image area different from the first image area, preferably in the form of a list. In particular, this list may be highlighted with a color, so that e.g. the state "good" is highlighted in green, while the states "overfilled" and "underfilled" are highlighted in red. This facilitates the quick detection of inadmissible states and at the same time the assessment which object has triggered this inadmissible state. Finally, in addition to the states "overfilled", "underfilled" and "good", a state "invalid" can be provided, too, which then comes into effect if no reliable image data could be captured.

The disclosure will be explained below in more detail with reference to the drawings based on a preferred embodiment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In the drawings.

Corresponding reference numerals indicate corresponding parts throughout the several views of the drawings.

DETAILED DESCRIPTION

Example embodiments will now be described more fully with reference to the accompanying drawings.

Figure 1:
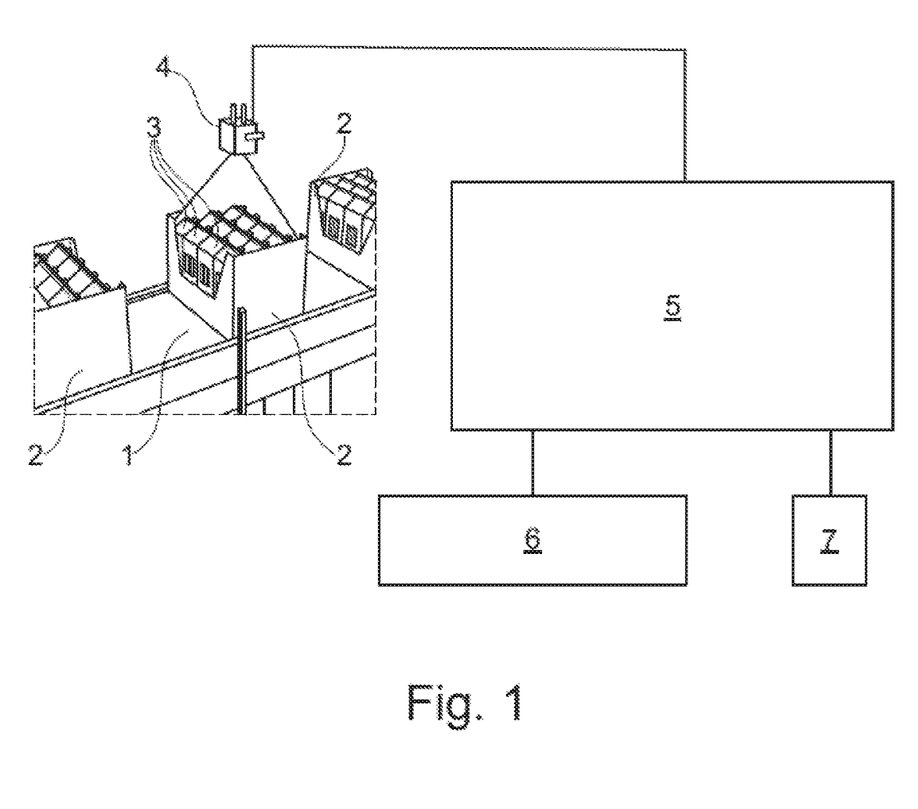
FIG. 1 schematically shows the setup for carrying out a method for completeness check according to a preferred exemplary embodiment of the disclosure.

FIG. 1 schematically shows the setup for performing a method for completeness check according to a preferred exemplary embodiment of the disclosure. On a conveyor belt 1 containers 2 are conveyed, each of which should be filled correctly with twelve objects 3. The containers 2 are open boxes filled with objects 3 in the form of milk cartons. By means of a 3D camera 4, which is arranged above the conveyor belt 1, a respective container 2 provided with objects 3 can be optically detected. Here, the 3D camera 4 provides a three-dimensional image in the form of a three-dimensional pixel matrix, wherein the pixel matrix includes distance values of the detected objects 3 with respect to the 3D camera 4 in one dimension and position values in respective planes perpendicular thereto in the other two dimensions. This three-dimensional image captured by the 3D camera 4 is transmitted to a display device 5 in the form of a screen and can be displayed there, as explained in detail below. According to the preferred embodiment of the disclosure described herein, a keyboard 6 and a pointing device 7, such as a mouse, are connected to the display device 5 in order to enable a user to make inputs. Alternatively, the display device 5 may be configured as a touch display, which makes a keyboard and a mouse dispensable.

Figure 2:
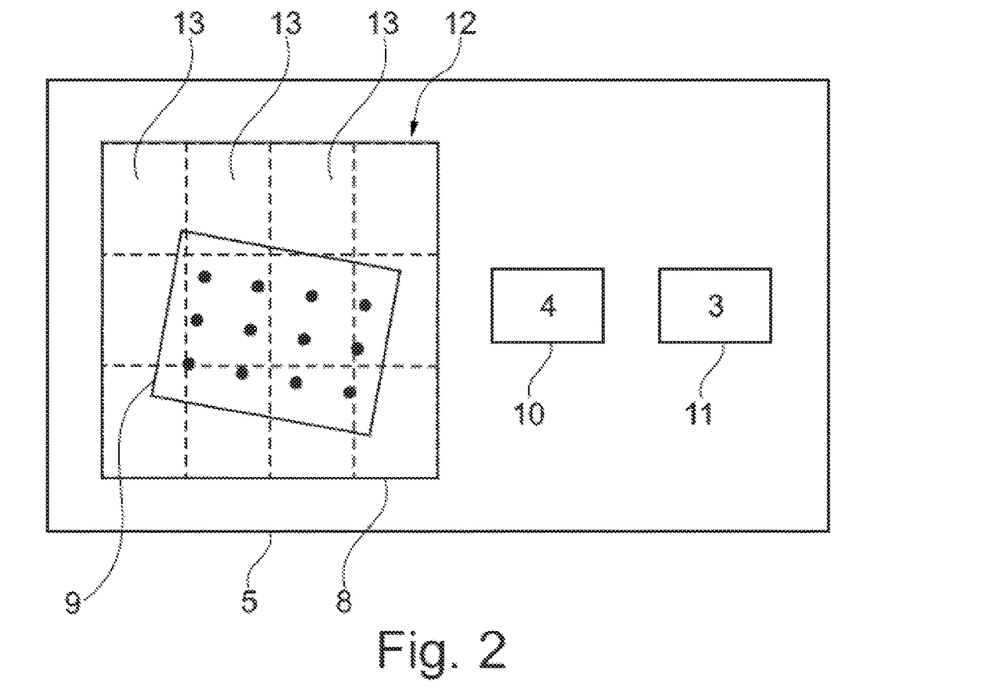
FIG. 2 shows a screen display for the method for completeness check according to the preferred exemplary embodiment of the disclosure in a first method step.

The sequence of a method according to the presently described preferred embodiment of the disclosure is as follows:

First, the learning mode of the method is carried out. For this purpose, in a state where the conveyor belt is switched off, that is to say when the container 2 is stationary, an image 9 of the objects 3 and the container 2, which are located below the 3D camera 4, is captured. The captured image 9 of the objects 3 and the container 2 is then displayed in a first image area 8 on the display device 5, as shown in FIG. 2. FIG. 2 also shows that a field 10 for indicating the columns and a field 11 for indicating the rows is shown for the user of the present method. Due to the present input of "4" for the columns and "3" for the rows, a multi-ROI 12 with a total of twelve ROIs 13 corresponding to the four columns and three rows is automatically created and displayed in the first image area 8. In this case, the column widths are automatically selected to be all identical, and also the row widths are automatically set to be all identical. That is, according to the presently described preferred exemplary embodiment of the disclosure, the multi-ROI is symmetrically divided into ROIs. In other words, in this step, the ROIs are optimally distributed across the multi-ROI.

FIGS. 1 to 7 show the method according to the disclosure on the basis of a regular structure, i.e. a structure where the number of columns is the same for all rows. However, the method according to the disclosure can also be applied in the same way to a honeycomb structure according to FIGS. 8 to 12. In addition, the method is also applicable to structures with a different number of columns per row, wherein the ROI may also be distributed irregularly. Such arbitrary structures can then be detected, for example, by individually shifting the ROIs 13.

Figure 3:
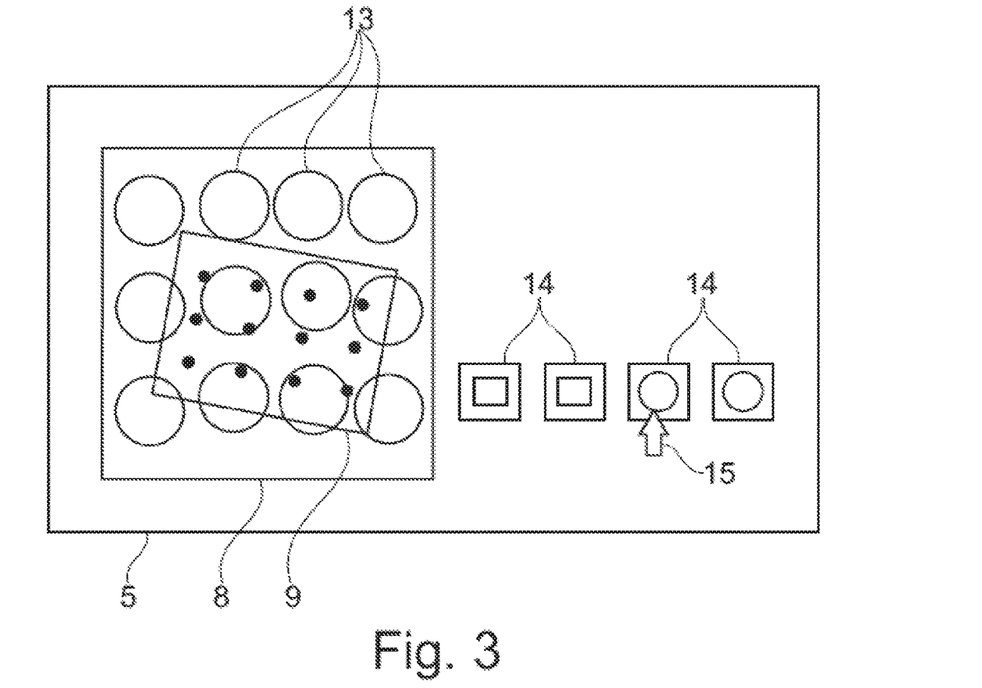
FIG. 3 shows a screen display of the method for completeness check according to the preferred exemplary embodiment of the disclosure in a further method step.

In the next step, which can be extracted from FIG. 3, the user of the method can select the shape of the ROIs. To this end, the shapes of a square, a rectangle, a circle and an ellipse within a corresponding button are offered to the user. By selecting the circular shape by means of the mouse pointer 15, the ROIs 13 in the first image area 8 are given a circular shape.

Figure 4:
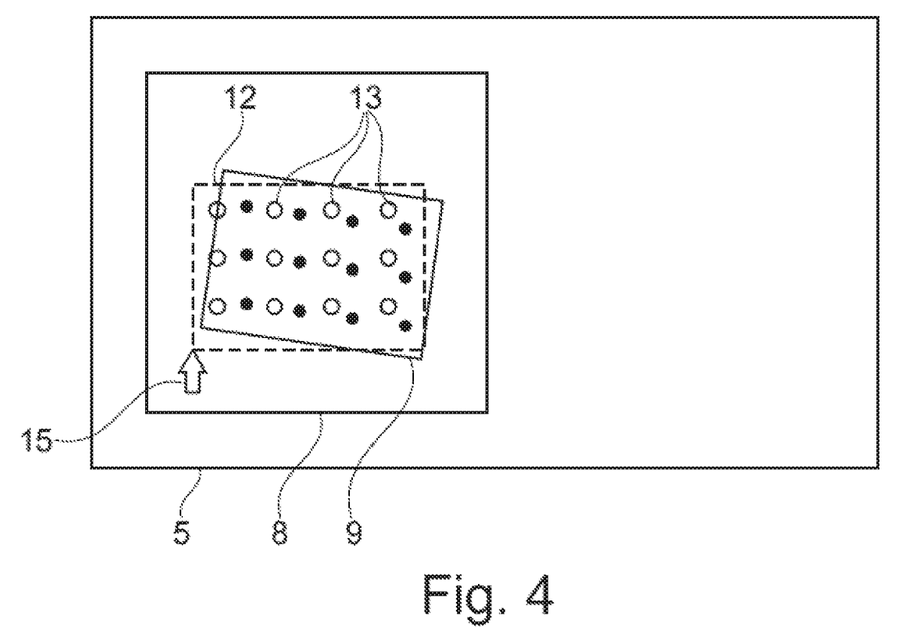
FIG. 4 shows a screen display of the method for completeness check according to the preferred exemplary embodiment of the disclosure in a further method step.

In the next step of the method shown in FIG. 4, the position and size of the multi-ROI 12 are now adapted to the reproduced image 9. This is done with the aid of the mouse pointer 15, by means of which by clicking on the multi-ROI 12 a shifting of the multi-ROI 12 and a change of its size is possible.

Figure 5:
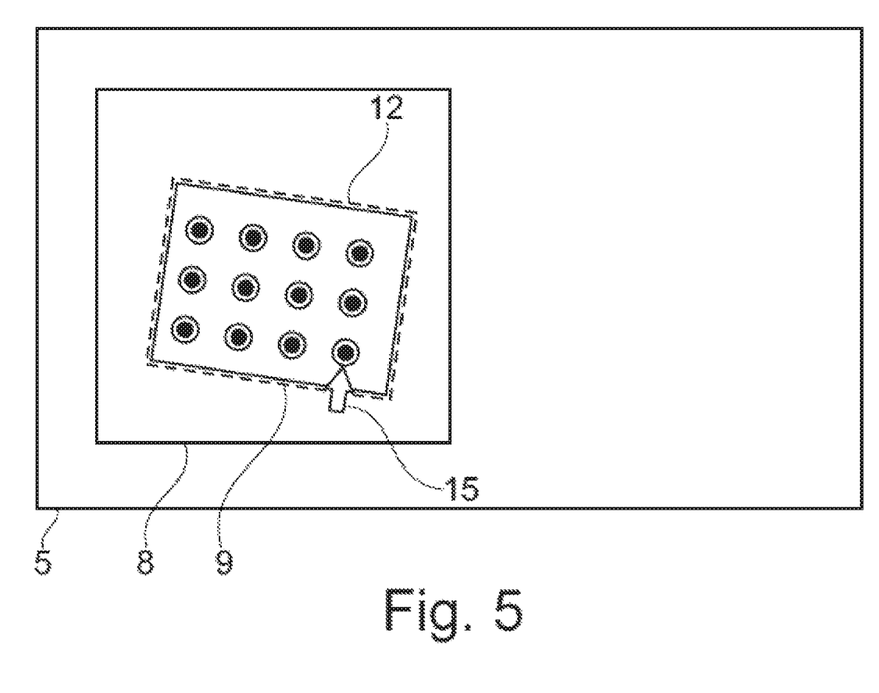
FIG. 5 shows a screen display of the method for completeness check according to the preferred exemplary embodiment of the disclosure in a further method step.

In the subsequent step, which is shown in FIG. 5, following the adaptation of the size and the position of the multi-ROI the skew of the multi-ROI 12 is now adapted to the image 9, too. The edge of the multi-ROI 12 thus corresponds to the edge contour of the image 9, which is formed by the container 2. The individual ROIs 13 now lie exactly above the areas of the images of the objects 3 in the container 2 to be detected. In addition to the size of the multi-ROIs 12, moreover, the sizes of the individual ROIS 13 can be changed by means of the mouse pointer 15. The size of the individual ROIs 13 is preferably dimensioned such that they cover 80% of the images of the objects 3 to be captured.

Figure 6:
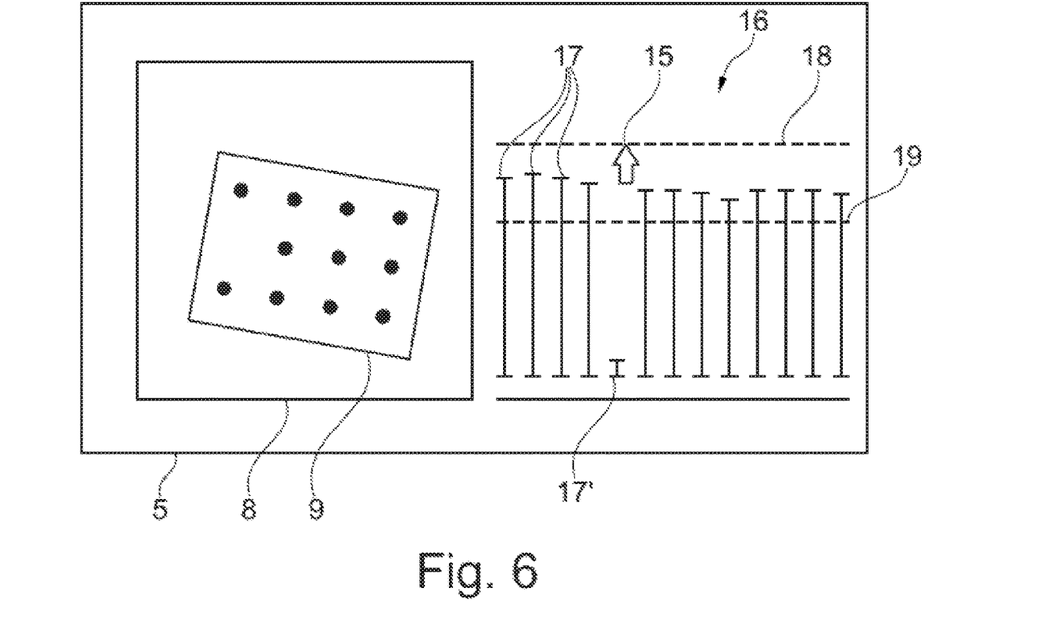
FIG. 6 shows a screen display for the method for completeness check according to the preferred exemplary embodiment of the disclosure in a further method step.

It can now be seen from FIG. 6 that in a second image area 16 different from the first image area 8 for each ROI 13 height values derived from the distance values are displayed, namely in the form of lines corresponding to the height values 17. Perpendicularly to these lines 17 an upper boundary 18 for an upper limit of the height values and a lower boundary 19 for a lower limit for the height values are displayed. These boundaries 18, 19 can be moved up and down by the user by means of the mouse pointer 15. In this way, the switching points can be adjusted in order to indicate different states of a respective ROI 13. If a respective height value of a ROI 13 lies on the upper or the lower limit or in between, this corresponds to the state "good". However, if the height value is above the upper limit, the state "overfilled" is present, and if the height value is below the lower limit, the state "underfilled" is present. In addition, a state "invalid" is possible, namely when no reliable height value has been detected.

In the present case, which can be seen in FIG. 6, an object is missing in the leftmost column in the second row. For this reason, only a small height value is determined for the corresponding ROI, which is reflected in a correspondingly shorter line 17' in the second image area 16. This line 17' is below the lower boundary 19, so that the state "underfilled" is detected here.

Figure 7:
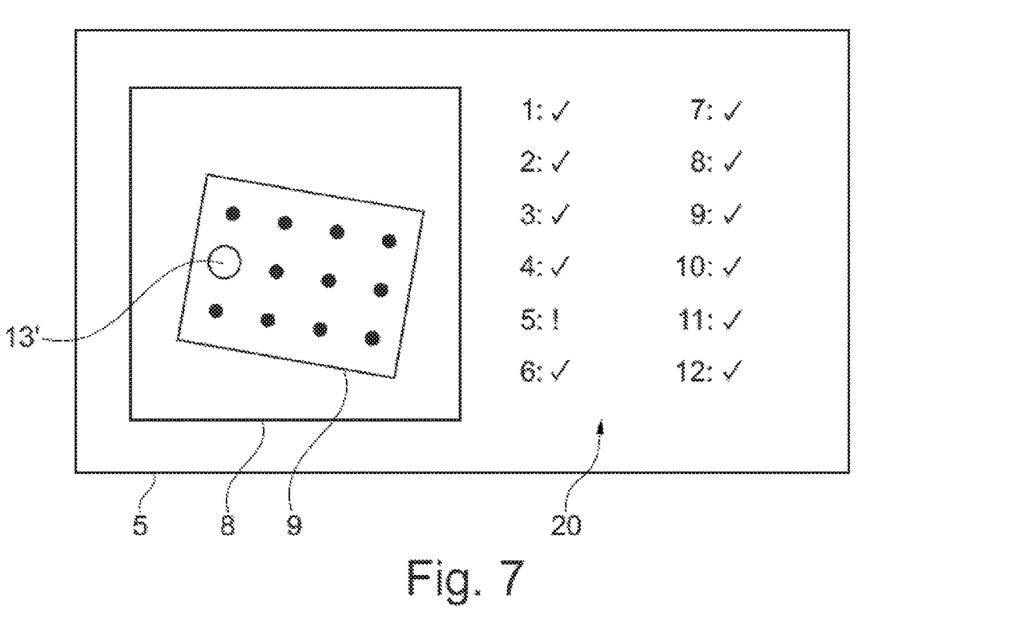
FIG. 7 shows a screen display of the method for completeness check according to the preferred exemplary embodiment of the disclosure in a further method step.

As finally shown in FIG. 7, this can be visualized in the working mode by displaying the corresponding ROI 13' in the first image area 8 in a different color. In addition, a table representation 20 is provided here outside the first image area 8, from which it can be seen that the ROI 13' with the consecutive number "5" has the state "underfilled".

Figure 8:
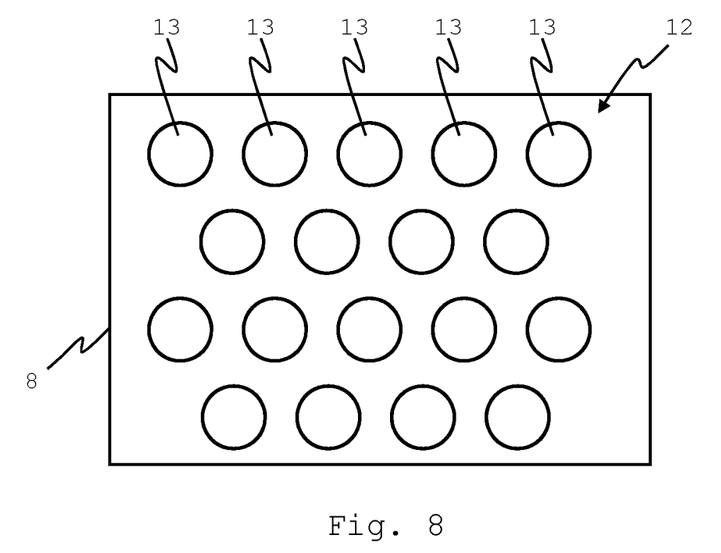
FIG. 8 shows a screen display for the method with a honeycomb-like arrangement of the detection areas and a short, second honeycomb row.

FIG. 8 shows a multi-ROI 12 for a honeycomb-like structure. The ROIs 13 are already displayed circularly in the image area 8. The illustrated structure has four rows, wherein the first and third rows each have 5 columns, and the second and fourth rows each have 4 columns. Such a structure is particularly advantageous for round products in order to achieve a high packing density. In order to specify such a honeycomb-like structure it is sufficient, for example, to specify the number of rows, the maximum number of columns, and preferably a characteristic of the second row. In the case illustrated in FIG. 8, the second row is characterized in that it is shorter than the first row. The structure can then be specified as follows: rows 4, columns 5, raster type 'short'.

Figure 9:
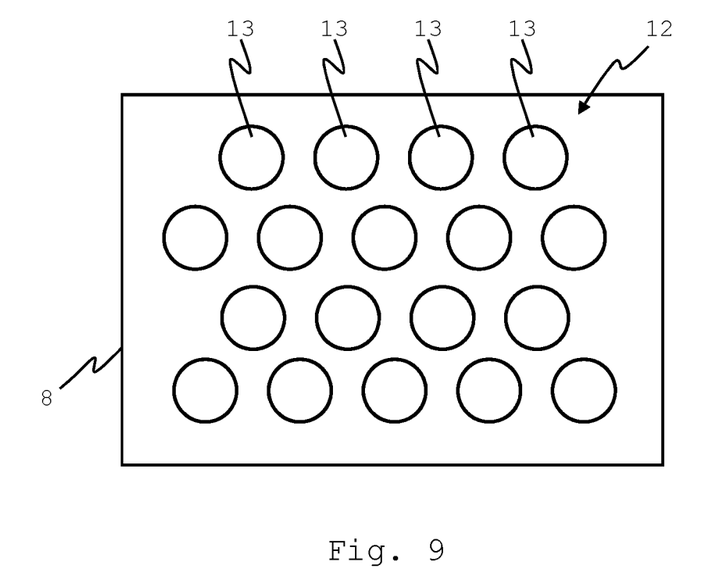
FIG. 9 shows a screen display for the method with a honeycomb-like arrangement of the detection areas and a long, second honeycomb row.

FIG. 9 shows a distribution of the ROIs 13 which is complementary to FIG. 8 and in which the second row is longer than the first one. This structure can preferably be specified as follows: rows 4, columns 5, raster type 'long'.

Figure 10:
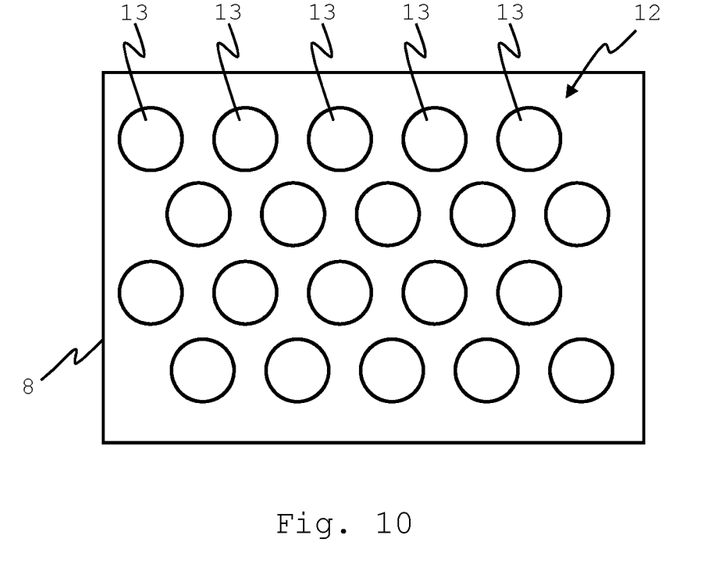
FIG. 10 shows a screen display for the method with a honeycomb-like arrangement of the detection areas and a second honeycomb row displaced to the right.
Figure 11:
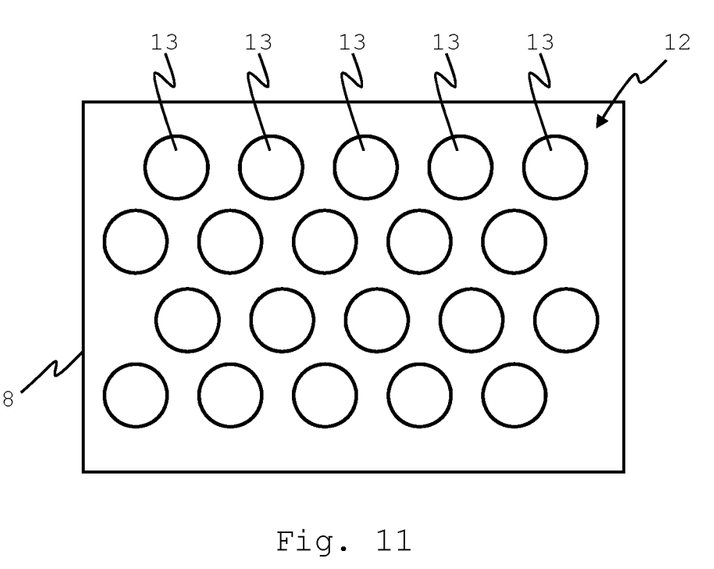
FIG. 11 shows a screen display for the method with a honeycomb-like arrangement of the detection areas and a second honeycomb row displaced to the left.

FIGS. 10 and 11 show further embodiments in which all rows have the same number of columns, but in FIG. 10 the second row is offset to the right and in FIG. 11 to the left. The structures according to FIGS. 10 and 11 accordingly are denoted by the specification rows 4, columns 5, raster type, 'right' or raster type 'left'.

Figure 12:
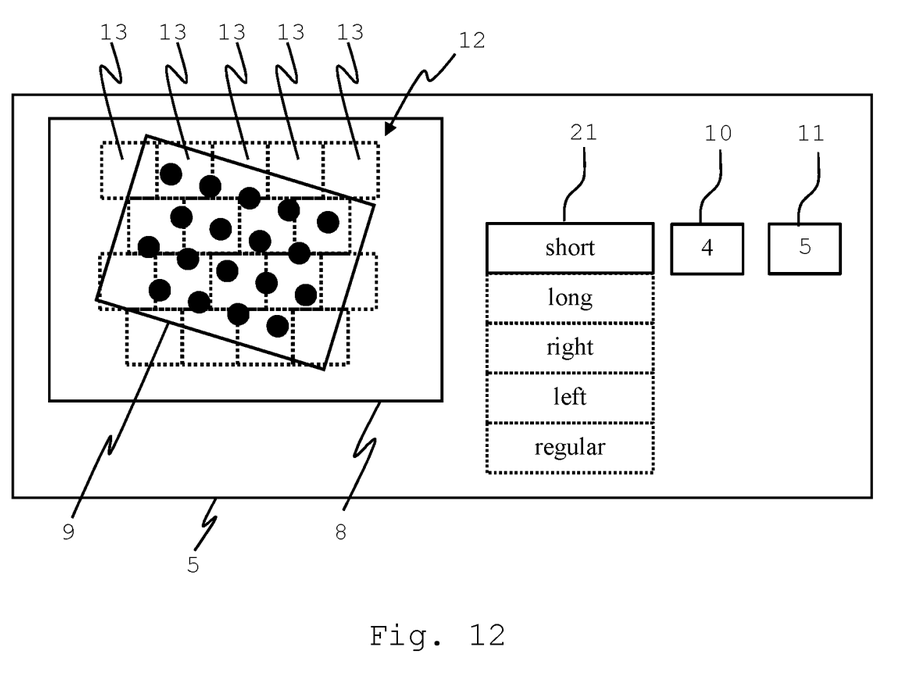
FIG. 12 shows a screen display for the method with a honeycomb-like arrangement of the detection areas and a plurality of selection fields for rows, columns and raster type.

FIG. 12 shows a display device analogous to the display device according to FIG. 2 in which, in addition to the fields for columns 10 and rows 11, a further field 21 for selecting the present structure or raster type is provided. As already described above, options for the raster type are: "short, long, right, left" and "regular" for the case where no honeycomb structure is present.

The remaining elements correspond to those already presented in FIG. 2, and the subsequent adaptation of the ROI, too, is implemented analogously to the procedure for the regular structure in accordance with the explanations relating to FIGS. 2 to 7.

The selection options of the raster type are of course not restricted to the examples shown. It is also conceivable to provide other arrangements in the selection menu. In particular, it is also conceivable to provide a selection "arbitrary" which, for example, in further method steps, offers the possibility to place the ROIs individually.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for completeness check of a container provided with a plurality of objects by means of a 3D camera which provides a three-dimensional image of the objects and a multi-region of interest, wherein the multi-region of interest includes a plurality of regions of interest comprising a user-settable shape and arranged within the multi-region of interest in a user-settable number of rows, columns and raster type, including a learning mode and a temporally subsequent working mode, wherein the learning mode comprises the following steps:
   capturing an image of the objects in the form of a three-dimensional pixel matrix by means of the 3D camera, wherein the pixel matrix in one dimension comprises distance values of the detected objects with respect to the 3D camera and in the two other dimensions comprises position values in respective planes perpendicular thereto;
   reproducing the captured image as a two-dimensional image with the position values in a first image area;
   displaying input fields for the shape or the number of rows, columns and raster type of the regions of interest;
   displaying a two-dimensional multi-region of interest with a user-entered number of rows, columns and raster type of the regions of interest and a user-entered shape of the regions of interest in the first image area;
   adjusting the size, position and skew of the multi-region of interest in response to at least one user input;
   adjusting the size of the regions of interest in response to at least one user input;
   displaying height values derived from the distance values for each region of interest in a second image area which is different from the first image area (8);
   displaying at least one of a lower limit and an upper limit for the height values in the second image area;
   adjusting at least one of the lower limit and the upper limit for the height values in response to at least one input of the user; and
   switching into the working mode, wherein the working mode comprises the following step:
   indicating a state of a respective region of interest, wherein the state of the respective region of interest is at least one of the states "overfilled", "underfilled" and "good", and wherein the state "overfilled" is indicated when the height value of the respective region of interest is above the upper limit, the state "underfilled" is indicated when the height value of the respective region of interest is below the lower limit, and the state "good" is indicated when the height value is not outside an intended limit.

2. The method according to claim 1, wherein the height values derived from the distance values for each region of interest in the second image area are displayed as lines with lengths corresponding to the respective height value.

3. The method according to claim 2, wherein the lower limit and the upper limit of the height values are displayed as boundaries extending perpendicular to the lines.

4. The method according to claim 3, wherein the boundaries can be shifted by the user by means of a cursor or a finger gesture.

5. The method according to claim 1, wherein in the learning mode when reproducing the captured image as a two-dimensional image with the position values in the first image area the distance data are indicated coded as colors or gray values.

6. The method according to claim 1, wherein in the learning mode the two-dimensional multi-region of interest is automatically generated based on the number of rows and columns input by the user such that all rows have the same row width and all columns have the same column width.

7. The method according to claim 1, wherein the shape of the regions of interest is the same for all regions of interest.

8. The method according to claim 1, wherein in the working mode the states of the respective regions of interest in the first image area are indicated coded as colors or gray values.

9. The method according to claim 1, wherein in the working mode the states of the respective regions of interest are displayed in an image area different from the first image area, preferably in the form of a list.

10. The method according to claim 1, wherein a time of flight camera is used as a 3D camera.

* * * * *